(12) United States Patent  
Wilson et al.

(10) Patent No.: US 8,587,775 B1
(45) Date of Patent: Nov. 19, 2013

(54) SOLAR TRACKING SYSTEM

(75) Inventors: Kitchener Clark Wilson, Santa Barbara, CA (US); Scott J. Rau, Murrieta, CA (US); Karl C. Oittinen, Irvine, CA (US)

(73) Assignee: The Boeing Company, Chicago, IL (US)

( * ) Notice: Subject to any disclaimer, the term of this patent is extended or adjusted under 35 U.S.C. 154(b) by 865 days.

(21) Appl. No.: 12/760,042

(22) Filed: Apr. 14, 2010

(51) Int. Cl.
*G01B 11/26* (2006.01)

(52) U.S. Cl.
USPC .................................................. 356/139.01

(58) Field of Classification Search
USPC ............. 356/3.01–3.15, 4.01–4.1, 5.01–5.15, 356/6–22, 28, 28.5, 139.01–139.1
See application file for complete search history.

(56) References Cited

U.S. PATENT DOCUMENTS

| 4,195,905 A | 4/1980 | Hansen |
| 6,216,983 B1 | 4/2001 | Wehner et al. |
| 2003/0045949 A1 * | 3/2003 | Stone et al. ..................... 700/61 |
| 2006/0238861 A1 * | 10/2006 | Baun et al. ..................... 359/430 |
| 2009/0314280 A1 | 12/2009 | Banerjee |
| 2010/0018518 A1 | 1/2010 | McDonald |
| 2010/0051017 A1 | 3/2010 | Xie et al. |

* cited by examiner

*Primary Examiner* — Luke Ratcliffe
(74) *Attorney, Agent, or Firm* — Diane M. Tsuda (57) ABSTRACT

A system for tracking a structure relative to the sun using an azimuth motor and an elevation motor, the system including an ephemeris calculator configured to output an anticipated azimuth angle and an anticipated zenith angle of the sun relative to the structure geographic location at a given time, a command calculator configured to generate an azimuth motor shaft position command corresponding to the anticipated azimuth angle and an elevation motor shaft position command corresponding to the anticipated zenith angle, an azimuth control loop configured to minimize a difference between the azimuth motor shaft position command and the actual azimuth motor shaft position, and an elevation control loop configured to minimize a difference between the elevation motor shaft position command and the actual elevation motor shaft position.

20 Claims, 4 Drawing Sheets

SOLAR TRACKING SYSTEM

FIELD

This application relates to solar tracking systems and, more particularly, to solar tracking systems that control the sunward orientation of solar power systems without the need for sun sensors or angle encoders.

BACKGROUND

Solar power systems, such as concentrated photovoltaic cell-based solar power systems and solar-thermal systems, provide an optimum power output when they are precisely aligned with the sun. Flat panel photovoltaic systems lacking concentrators also benefit from sun alignment. Therefore, solar power systems may be mounted on solar tracking systems that are configured to maintain alignment between the associated solar power systems and the sun as the sun moves across the sky.

A concentrated photovoltaic ("CPV") cell typically includes a photovoltaic element that produces electric power from incident sunlight, and a focusing element that concentrates the sunlight falling over a protracted area onto the cell. The focusing element should be pointed accurately toward the sun, within better than a degree, and should move with the sun in a sun tracking manner. CPV cells are generally grouped in arrays such that the CPV cells are pointed toward the sun when the array is pointed toward the sun.

A typical solar tracking system includes electric motors, gears, sensors, processors and angular position encoders, all of which substantially increase the initial capital cost and present reliability and on-going maintenance issues, thereby increasing the cost of generated electricity. For example, a conventional solar tracking system uses sun sensors, such as photodiodes, pixel cameras or the like, that are mounted in view of the sun and are exposed to the environment. Such sun sensors are arranged to indicate the sun position relative to the array. However, such sun sensors generally have pointing vectors that are skewed from that of the array, thereby requiring calibration in two-dimensions—a non-trivial operation. Once calibrated, the array is moved to track the sun by motors in a closed loop manner with the sun sensor outputs. Therefore, the use of sun sensors introduces the need for on-going maintenance, such as cleaning the optical elements of the sun sensor and maintaining the sun sensor aligned with its original pointing vector.

Another conventional approach to solar tracking uses the calculable sun position as a function of array latitude/longitude and time. Once the sun zenith and azimuth position is known, angle encoders having sub-degree resolution provide array orientation feedback to point the array toward the sun. However, angle encoders are expensive and must be protected from the environment. Furthermore, a calibration step is required to determine the array pointing vector with respect to the angle encoder outputs.

Ideally the electronics of a solar tracking system are mounted within a single environment protecting enclosure with a minimum of external sensors (such as limit switches, sun sensors and angle encoders) and cables and requisite connectors. Motors for changing the array orientation are unavoidably remote.

Accordingly, those skilled in the art continue to seek new solar tracking systems, including solar tracking systems that provide precise solar alignment without the expense, maintenance and reliability issues associated with sun sensors, angle encoders, limit switches, and such.

SUMMARY

In one aspect, the disclosed solar tracking system may be used for tracking a structure relative to the sun using an azimuth motor and an elevation motor. The system may include an ephemeris calculator configured to output the anticipated azimuth angle and the anticipated zenith angle of the sun relative to the geographic location of the structure, a command calculator configured to generate an azimuth motor rotational position command corresponding to the anticipated sun azimuth angle and an elevation motor shaft rotational position command corresponding to the anticipated sun zenith angle, an azimuth motor control loop configured to minimize the difference between the azimuth motor shaft rotational position command and the measured shaft rotational position, and an elevation control loop configured to minimize a difference between the elevation motor shaft rotational position command and the measured shaft rotational position.

In another aspect, the disclosed solar tracking system may include a pedestal that defines a vertical axis, a solar array connected to the pedestal such that the solar array is rotatable about the vertical axis and pivotable relative to the vertical axis, an azimuth motor operatively connected to the solar array to effect movement of the solar array about the vertical axis, the azimuth motor having a measurable actual shaft rotational position, an elevation motor operatively connected to the solar array to pivot the solar array relative to the vertical axis, the elevation motor having a measurable actual shaft rotational position, ephemeris calculator configured to output the anticipated azimuth angle and the anticipated zenith angle of the sun relative to the geographic location of the structure, a command calculator configured to generate an azimuth motor shaft rotational position command corresponding to the anticipated sun azimuth angle and an elevation motor shaft rotational position command corresponding to the anticipated sun zenith angle, an azimuth motor control loop configured to minimize the difference between the azimuth motor shaft rotational position command and the measured shaft rotational position, and an elevation control loop configured to minimize a difference between the elevation motor shaft rotational position command and the measured shaft rotational position.

Other aspects of the disclosed solar tracking system will become apparent from the following description, the accompanying drawings and the appended claims.

DETAILED DESCRIPTION

Figure 1:
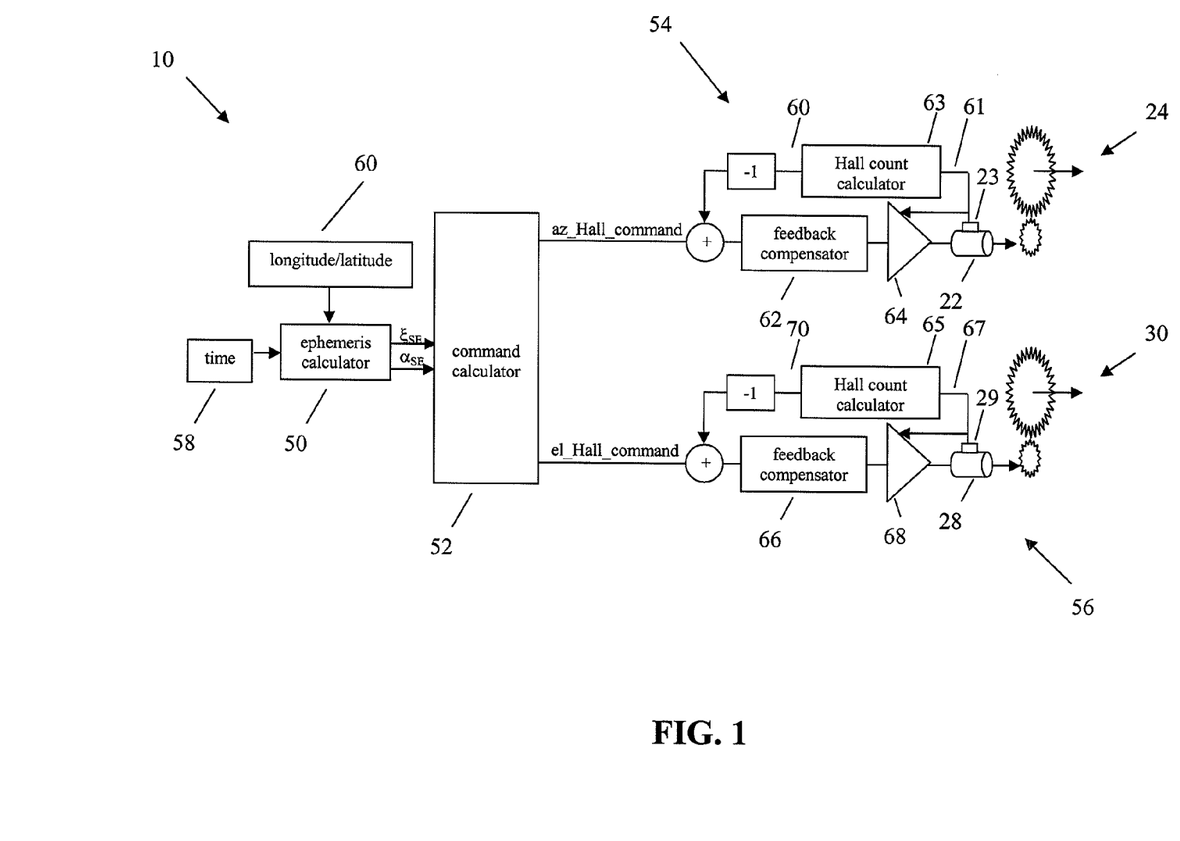
FIG. 1 is a schematic illustration of one aspect of the disclosed solar tracking system.
Figure 2:
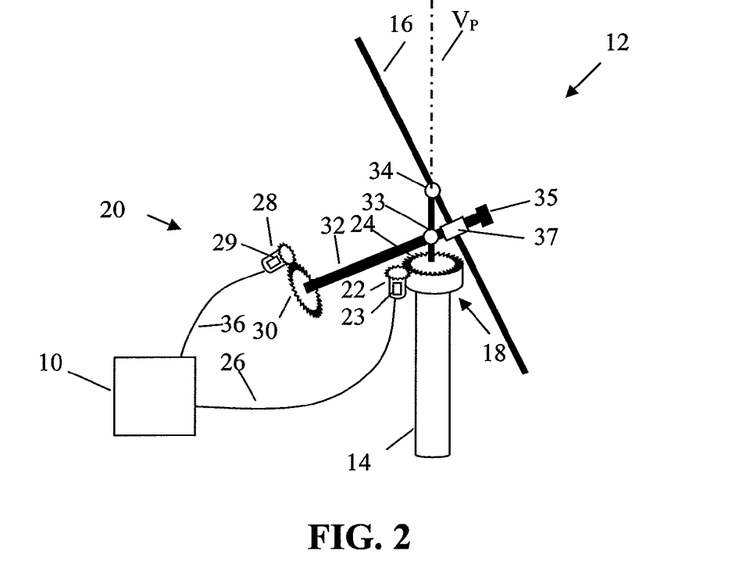
FIG. 2 is a schematic illustration of a solar power system provided with the solar tracking system of FIG. 1.

Referring to FIGS. 1 and 2, the disclosed solar tracking system 10 may be used to control the orientation of a solar power system 12 to maintain alignment between the solar power system 12 and the sun. The solar power system 12 may be any solar power system, such as a photovoltaic system, a solar thermal system, a concentrating solar power system or the like, that may benefit from alignment with the sun.

In one particular implementation, the solar power system 12 may include a pedestal 14, a solar array 16, an azimuth drive assembly 18 and an elevation drive assembly 20. The azimuth drive assembly 18 may include an azimuth motor 22 and a reduction gear/linkage assembly 24 for rotating the solar array 16 about the vertical axis $V_P$ of the pedestal 14 in response to rotational power supplied by the azimuth motor 22. The elevation drive assembly 20 may include an elevation motor 28, a reduction gear/linkage assembly 30, a linear actuator 32, and the linear actuator hinge points 33 and 37 for pivoting the solar array 16 about a hinge point 34 in response to rotational power supplied by the elevation motor 28.

The motor rotational position sensors 23, 29 responding to the rotation of the shaft may be incremental devices responding to angular steps changes of the motor shafts, such as Hall magnetic sensors responding to the magnetic signals within the motor or optical devices. The sensors may be absolute encoder reporting the angular position of the motor shaft, such as various optical sensors. For illustrative purposes, incremental Hall sensors built into brushless motors are here considered.

The azimuth motor 22 of the azimuth drive assembly 18 may include one or more sensors 23 providing motor shaft rotational position information. The azimuth motor 22, including sensors 23 and motor drive signals, may be in communication with the solar tracking system 10 by way of a first communication line 26. For example, the azimuth motor 22 may be a two-pole brushless motor with three Hall sensors 23 such that the motor shaft position may be known in 60° increments and these increments may be accumulated into 60° counts to provide net motor shaft rotational position. The sensors are normally an integral part of the brushless motor and used to synchronize the motor drive phasing. Although 60° resolution is quite coarse, those skilled in the art will appreciate that a high ratio (e.g., tens-of-thousands to 1) reduction gear/linkage assembly 30 may result in very high array position resolution.

The elevation motor 28 of the elevation drive assembly 20 may include one or more sensors 29 providing motor shaft rotational position information. The elevation motor 28, including the sensors 29 and motor drive signals, may be in communication with the solar tracking system 10 by way of a second communication line 36. For example, like the azimuth motor 22, the elevation motor 28 may be a two-pole brushless motor with three Hall sensors 29 such that the motor shaft position may be known in 60° increments and these increments may be accumulated into 60° counts to provide net motor shaft rotational position.

Thus, the solar tracking system 10 may control the azimuth drive assembly 18 and the elevation drive assembly 20 to position and maintain the solar array 16 in alignment with the sun in response to signals received from the sensors 23 and 29.

Referring to FIG. 1, one aspect of the solar tracking system 10 may include an ephemeris calculator 50, a command calculator 52, an azimuth control loop 54 that controls the azimuth motor 22, and an elevation control loop 56 that controls the elevation motor 28. Inputs to the solar tracking system 10 may include the time 58 and the geographic location 60 of the solar power system 12, among other possible inputs. The location input 60 may include latitude and longitude data, global positioning system coordinates or the like.

The ephemeris calculator 50 may be configured to receive the time 58 and location 60 inputs and output the anticipated azimuth $\alpha_{SE}$ and zenith $\xi_{SE}$ of the sun relative to the location of the solar power system 12. Those skilled in the art will appreciate that there are many different databases and algorithms that may function as, or may be incorporated into, the ephemeris calculator 50. For example, the ephemeris calculator 50 may run the "solar position algorithm for solar radiation applications" authored by Ibrahim Reda and Afshin Andreas of the National Renewable Energy Laboratory, a revised version of which was published in January of 2008 as document number NREL/TP-560-34302.

The command calculator 52, which is described in greater detail below, may be configured to output a net azimuth Hall count command az_Hall_command to the azimuth control loop 54 and a net elevation Hall count command el_Hall_command to the elevation control loop 56 based on the anticipated azimuth $\alpha_{SE}$ and zenith $\xi_{SE}$ angles provided by the ephemeris calculator 50. In one particular expression, the command calculator 52 may convert the zenith angle $\xi_{SE}$ into an elevation angle $\epsilon_{SE}$ ($\epsilon_{SE}=90°-\xi_{SE}$) prior to generating the net elevation Hall count command el_Hall_command.

The azimuth control loop 54 may include an azimuth feedback compensator 62, an azimuth motor power amplifier 64, and a Hall count calculator 63 that converts the Hall sensor signals 61 to a net Hall position az_Hall_position 60. The azimuth feedback compensator 62 may be configured to generate an amplifier drive signal in response to a Hall count error signal, wherein the Hall count error signal may be the difference between the azimuth Hall count command signal az_Hall_command and the actual azimuth Hall count az_Hall_position. For example, the azimuth feedback compensator 62 may be configured with a control algorithm, such as PI, PID, bang-bang or the like, and the resulting amplifier drive output signal may be in the form of a digital signal, an analog signal, a pulse-width-modulated signal or the like. The azimuth motor power amplifier 64 may use the amplifier drive signal generated by the azimuth feedback compensator 62 and the Hall sensor signals 61 to power the azimuth motor 22.

Likewise, the elevation control loop 56 may include an elevation feedback compensator 66, an elevation motor power amplifier 68, and a Hall count calculator 65 that converts the Hall sensor signals 67 to a net Hall position el_Hall_position 70. The elevation feedback compensator 66 may be configured to generate an amplifier drive signal in response to a Hall count error signal, wherein the Hall count error signal may be the difference between the elevation Hall count command signal el_Hall_command and the actual elevation Hall count el_Hall_position. For example, the elevation feedback compensator 66 may be configured with a control algorithm, such as continuous or discrete-time PI, PID, bang-bang or the like, and the resulting amplifier drive signal may be in the form of a digital signal, an analog signal, a pulse-width-modulated signal or the like. The elevation motor power amplifier 68 may use the amplifier drive signal generated by the elevation feedback compensator 66 and the hall sensor signals 67 to power the elevation motor 28.

Command Calculator

As described above, the command calculator 52 may be configured to output an azimuth Hall count command az_Hall_command to the azimuth control loop 54 and an elevation Hall count command el_Hall_command to the elevation control loop 56 based on the anticipated azimuth $\alpha_{SE}$ and zenith $\xi_{SE}$ angles provided by the ephemeris calculator 50. Furthermore, the command calculator 52 may be configured to account for the mechanical characteristics of the solar power system 12 (including the pedestal 14, the motors 22, 28, gear/linkage assemblies 24, 30, 32, 33, 34, 37) in generating the commands az_Hall_command and el_Hall_command. Therefore, the following issues may be considered by the command calculator 52 when describing the solar power system 12: (1) the fixed offsets of the pedestal 14 with respect to the axes used by the ephemeris calculations; (2) the azimuth drive assembly 18; (3) the linear and nonlinear aspects of the elevation drive assembly 20; (4) the offsets between the azimuth and elevation drive assemblies 18, 20 with respect to the net array pointing vector; and (5) the unit-to-unit variations.

Figure 3:
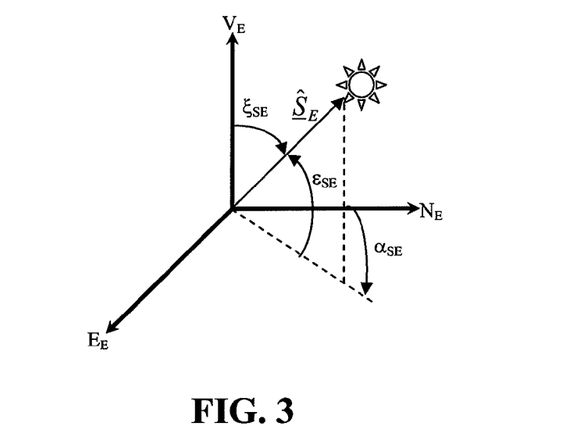
FIG. 3 is a graphical illustration of a sun vector in the ephemeris axes in accordance with the solar tracking system of FIG. 1.

Given the anticipated azimuth $\alpha_{SE}$ and zenith $\xi_{SE}$ angles of the sun, the sun vector in the ephemeris axes may be illustrated as shown in FIG. 3 and may be given by:

$$\hat{S}_E = \begin{bmatrix} e_{SE} \\ n_{SE} \\ v_{SE} \end{bmatrix} \qquad \text{Eq. 1}$$

$$= \begin{bmatrix} \sin\xi_{SE}\sin\alpha_{SE} \\ \sin\xi_{SE}\cos\alpha_{SE} \\ \cos\xi_{SE} \end{bmatrix}$$

Figure 4:
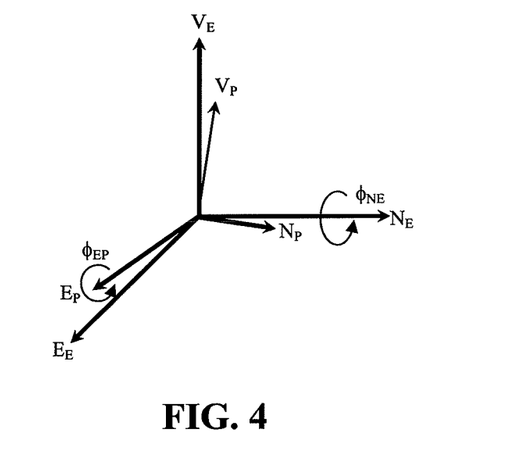
FIG. 4 is a graphical illustration of the axes of the solar power system of FIG. 2 relative to the ephemeris axes.

The ephemeris calculator 50 may use orthogonal east-north-vertical axes ($E_E$, $N_E$, $V_E$) established using a model of the local surface of the Earth at the site in question. The values produced by the ephemeris calculator 50 may be the zenith angle $\xi_{SE}$ of the sun (angle from vertical down to the sun) and the azimuth angle $\alpha_{SE}$ of the sun (angle Easterly from North). Given the pedestal 14 is typically mounted along the local gravity vector, even if perfectly aligned it may be offset from the ephemeris axes by small angles $\phi_{NE}$ and $\phi_{EP}$ about the $N_E$ and $E_P$ axes, as shown in FIG. 4.

Thus, the sun vector in the pedestal axes may be given by:

$$\hat{S}_P = \begin{bmatrix} e_{SP} \\ n_{SP} \\ v_{SP} \end{bmatrix} \qquad \text{Eq. 2}$$

$$= \begin{bmatrix} \cos\phi_{NE} & 0 & -\sin\phi_{NE} \\ \sin\phi_{EP}\sin\phi_{NE} & \cos\phi_{EP} & \sin\phi_{EP}\cos\phi_{NE} \\ \cos\phi_{EP}\sin\phi_{NE} & -\sin\phi_{EP} & \cos\phi_{EP}\cos\phi_{NE} \end{bmatrix} \hat{S}_E$$

$$\approx \begin{bmatrix} 1 & 0 & -\phi_{NE} \\ 0 & 1 & \phi_{EP} \\ \phi_{NE} & -\phi_{EP} & 1 \end{bmatrix} \hat{S}_E$$

$$= T(\phi_{EP}, \phi_{NE})\hat{S}_E$$

where the angles are measured in radians. The elevation and azimuth angles in the rotated pedestal axes may be given by:

$$\varepsilon_{SP} = \tan^{-1}\left(\frac{v_{SP}}{\sqrt{n_{SP}^2 + e_{SP}^2}}\right) \qquad \text{Eq. 3}$$

$$\alpha_{SP} = \tan^{-1}\left(\frac{e_{SP}}{n_{SP}}\right)$$

As noted above, the azimuth drive assembly 18 may include the azimuth motor 22 and a reduction gear/linkage assembly 24 that rotates the solar array 16 about the vertical axis $V_P$ of the pedestal 14. The azimuth angle of the linkage assembly 24 may be given by:

$$\alpha_{SP} = \alpha_{SP,0} + h_{azimuth}\frac{60°}{g_{azimuthGearRatio}} \qquad \text{Eq. 4}$$

where $h_{azimuth}$ is the net number of Hall counts 60, $\alpha_{SP,0}$ is the link azimuth position when $h_{azimuth}$ is initialized to 0, and $g_{azimuthGearRatio}$ is the reduction gear ratio. The 60° coefficient is for a two-pole brushless motor and is replaced by 30° if four-pole and 20° if six-pole.

Figure 5:
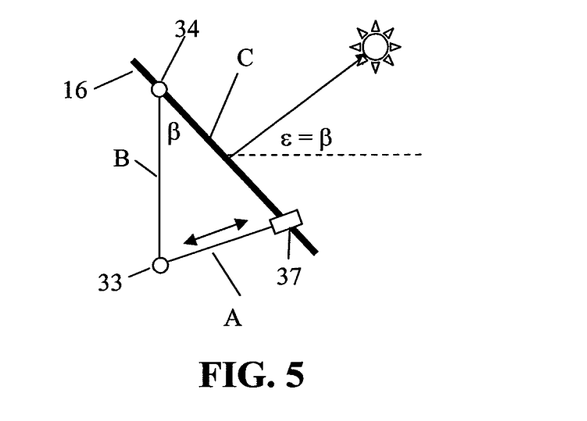
FIG. 5 is a schematic illustration of the elevation linkage of the solar power system of FIG. 2.

A portion of the elevation drive assembly 20 is shown in greater detail in FIG. 5 and its geometry may be described by:

$$A = A_0 + \rho h_{zenith}\frac{60°}{360°g_{elevationGearRatio}} \qquad \text{Eq. 5}$$

$$\beta = \cos^{-1}\left(\frac{B^2 + C^2 - A^2}{2BC}\right)$$

$$\varepsilon_{SP} = \beta$$

where A is the variable partial actuator length between hinges 30, 37, B is the fixed strut length between hinges 34, 37, C is the fixed array segment length between hinges 33, 34, $h_{zenith}$ is the net number of Hall counts 70, $\rho$ is the linear actuator movement per rotation, $A_0$ is the linear actuator length when $h_{zenith}$ is initialized to zero, and $g_{elevationGearRatio}$ is the reduction gear ratio between the elevation motor and the linear actuator shaft. The 60° coefficient is for a two-pole brushless motor and is replaced by 30° if four-pole and 20° if six-pole.

The array may be offset from these ideal pedestal angles such that actual sun angles of the array are:

$$\varepsilon_{SA} = \varepsilon_{SP} + \Delta\varepsilon_A$$

$$\alpha_{SA} = \alpha_{SP} + \Delta\alpha_A \qquad \text{Eq. 6}$$

where $\Delta\varepsilon_A$ and $\Delta\alpha_A$ are the elevation and azimuth offset angles of the array 16 from that of the pedestal 14.

The sun vector in ephemeris coordinates may be given by Eq. 1. Since the pedestal is rotated with respect to ephemeris, the Sun vector in the pedestal axes is, from Eq. 2, $$\hat{S}_P = T(\phi_{EP}, \phi_{NE})\hat{S}_E$$

resulting in pedestal angles, from Eq. 3:

$$\varepsilon_{SP} = \tan^{-1}\left(\frac{v_{SP}}{\sqrt{n_{SP}^2 + e_{SP}^2}}\right)$$

$$\alpha_{SP} = \tan^{-1}\left(\frac{e_{SP}}{n_{SP}}\right)$$

The desired values to match the ephemeris angles are, from Eq. 4:

$$\alpha_{SP} = \alpha_{SP,0} + \Delta\alpha_A + h_{azimuth}\frac{60°}{g_{azimuthGearRatio}}$$

$$\varepsilon_{SP,desired} = \Delta\varepsilon_A + \cos^{-1}\left(\frac{B^2 + C^2 - A^2}{2BC}\right)$$

resulting in, from Eq. 5:

$$h_{azimuth} = [\alpha_{SP} - (\Delta\alpha_A + \alpha_{SP,0})]\frac{g_{azimuthGearRatio}}{60°}$$

$$A = \sqrt{B^2 + C^2 - 2BC\cos(\varepsilon_{SP} - \Delta\varepsilon)}$$

$$h_{elevation} = (A - A_0)\frac{360° g_{elevationGearRatio}}{60° \rho}$$

Thus, when controlling the azimuth and elevation motors 22, 28, the hall count values $h_{azimuth}$, $h_{elevation}$ may correspond to the Hall count commands az_Hall_command, el_Hall_command shown in FIG. 1.

Model Calibration

The foregoing mathematical model, used by the command calculator 52 to calculate az_Hall_command and el_Hall_command, is presented in terms of parameters describing the angular and mechanical offsets of the various structural components, as well as the effect of motor rotation on the array orientation. Some of the parameters may be numerically valued based on known values (e.g., gear ratios), but some are unknown and dependent on the particular installation (e.g., mount tilt with respect to ephemeris axes), and some on initial values (e.g., linkage lengths and angular rotations). These unknown parameter values may be estimated by calibrating (curve fitting) the model in a manner that causes the array motion to track the sun. The five parameters that require determination may include $\phi_{EP}$, $\phi_{NE}$, $A_0$, $\Delta\varepsilon_A$, and the net array azimuth offset $(\Delta\alpha_A + \alpha_{SP,0})$.

Calibration may be performed by determining the Hall count values $h_{azimuth}$, $h_{elevation}$ that point the array toward the sun and comparing these to the known ephemeris of the sun. This ephemeris-to-Hall-count pairing may be used in a curve fitting procedure that estimates the unknown parameter values, and may be performed once or more than once (e.g., at predetermined intervals).

By definition the array 16 may be considered pointed toward the sun when it is generating maximum short circuit current, $I_{shortCircuit}$, as it is well known that the photovoltaic short circuit current is proportional to the incident solar energy. The calibration process may begin by intermittently establishing the Hall counts that maximize $I_{shortCircuit}$ as the sun moves during the day. These sets of paired values may be used to curve fit parameter values.

The solar array 16 may not be alone, but rather may be electrically connected to other solar arrays to feed a common power inverter. The electrical output of the array may be dependent on the varying load provided by the inverter as it works to maximize the acquired power, and on the electrical voltages and currents generated by the other interconnected arrays. Accurate measurement of array $I_{shortCircuit}$ may require the array be isolated from the inverter and other arrays. The $I_{shortCircuit}$ is dependent on the solar irradiation and temperature conditions which must be reasonably constant during the time the maximum $I_{shortCircuit}$ at each intermittent point is being determined.

Once the array 16 is isolated, as described in greater detail below, its $I_{shortCircuit}$ may be measured as the array is moved in azimuth and elevation and the Hall counts of the maximum are noted along with the sun ephemeris position. After acquiring several of these maxima, a mathematical model of the array structural components may be curve fit to estimate the values of unknown model parameters. Once estimated, the model and its parameter values may provide a means to compute Hall counts in terms of sun ephemeris positions and may form the basis of the Hall count calculator 52.

The array $I_{shortCircuit}$ maxima may be found in various ways. For example, the array $I_{shortCircuit}$ may be monitored as the maximum is approached and passed while moving in a single direction, for example azimuth while elevation is held in the neighborhood of the maximum. Measured $I_{shortCircuit}$ levels may be curve fit with a parabola as a function of azimuth Hall counts:

$$I_{shortCircuit}(az\_hall) = a_2(az\_hall)^2 + a_1(az\_hall) + a_0$$

Curve fitting the array $I_{shortCircuit}$ about the maximum may smooth the data points and provide the values of the coefficients $a_0$, $a_1$ and $a_3$. The location of the maximum may be interpolated by setting the derivative of the parabola to zero:

$$az\_hall_{max} = -\frac{a_1}{2a_2}$$

Holding this azimuth position, elevation may be scanned in a similar manner to determine $el\_Hall_{max}$.

Curve fitting may also be used to estimate the unknown parameters of Eq. 1-6. For example, the sets of quartets $(az\_Hall_{max}, el\_Hall_{max}, \alpha_{SE}, \xi_{SE})$ acquired as the sun moves along its trajectory are related to the known and unknown parameters through Eqs. 1-6. Values of the unknown parameters may be selected using a scalar cost functional whose value is reduced as the values of the unknowns approach an optimum. One such cost functional is formed as the square distance between the ephemeris sun vector and the sun vector formed using a set of parameter values. Given values of the unknown parameter vector:

$$\underline{p} = \begin{bmatrix} A_0 \\ \Delta\varepsilon_A \\ \Delta\alpha_A + \alpha_{SP,0} \\ \phi_{EP} \\ \phi_{NE} \end{bmatrix}$$

and Eqs. 1-6, for each $az\_Hall_{max}$ and $el\_Hall_{max}$:

$$A(\underline{p}, el\_hall_{max}) = A_0 + \rho el\_hall_{max}\frac{60}{360 g_{elevationGearRatio}}$$

$$\varepsilon_{SP}(\underline{p}, el\_hall_{max}) = \cos^{-1}\left(\frac{B^2 + C^2 - A(\underline{p}, el\_hall_{max})^2}{2BC}\right)$$

$$\varepsilon_{SA}(\underline{p}, el\_hall_{max}) = \varepsilon_{SP}(\underline{p}, el\_hall_{max}) + \Delta\varepsilon_A$$

$$\alpha_{SA}(\underline{p}, az\_hall_{max}) = (\Delta\alpha_A + \alpha_{SP,0}) + \alpha z\_hall_{max}\frac{60}{g_{azimuthGearRatio}}$$

the Sun vector seen by the array is:

$$\hat{\underline{S}}_A(\underline{p}, \text{el\_hall}_{max}, \text{az\_hall}_{max}) = \begin{bmatrix} e_{SA}(\underline{p}, \text{el\_hall}_{max}, \text{az\_hall}_{max}) \\ n_{SA}(\underline{p}, \text{el\_hall}_{max}, \text{az\_hall}_{max}) \\ v_{SA}(\underline{p}, \text{el\_hall}_{max}, \text{az\_hall}_{max}) \end{bmatrix} =$$

$$\begin{bmatrix} \cos\varepsilon_{SA}(\underline{p}, \text{el\_hall}_{max})\sin\alpha_{SA}(\underline{p}, \text{az\_hall}_{max}) \\ \cos\varepsilon_{SA}(\underline{p}, \text{el\_hall}_{max})\cos\alpha_{SA}(p, \text{az\_hall}_{max}) \\ \sin\varepsilon_{SA}(\underline{p}, \text{el\_hall}_{max}) \end{bmatrix}$$

and the equivalent vector seen in the ephemeris axes is:

$$\hat{\underline{S}}_E(\underline{p}, \text{el\_hall}_{max}, \text{az\_hall}_{max}) = \begin{bmatrix} e_{SE}(\underline{p}, \text{el\_hall}_{max}, \text{az\_hall}_{max}) \\ n_{SE}(\underline{p}, \text{el\_hall}_{max}, \text{az\_hall}_{max}) \\ v_{SE}(\underline{p}, \text{el\_hall}_{max}, \text{az\_hall}_{max}) \end{bmatrix}$$

$$\underline{T}^T(\phi_{EP}, \phi_{NE})\hat{\underline{S}}_A(\underline{p}, \text{el\_hall}_{max}, \text{az\_hall}_{max})$$

The actual Sun vector in ephemeris axes is:

$$\hat{\underline{S}}_E(\xi_{SE}, \alpha_{SE}) = \begin{bmatrix} e_{SE}(\xi_{SE}, \alpha_{SE}) \\ n_{SE}(\xi_{SE}, \alpha_{SE}) \\ v_{SE}(\xi_{SE}, \alpha_{SE}) \end{bmatrix}$$

$$= \begin{bmatrix} \sin\xi_{SE}\sin\alpha_{SE} \\ \sin\xi_{SE}\cos\alpha_{SE} \\ \cos\xi_{SE} \end{bmatrix}$$

and the square error cost function over K quartets is:

$$J(\underline{p}) = \sum_{k=1}^{K} \left\{ \begin{array}{l} [e_{SE}(\xi_{SE,k}, \alpha_{SE,k}) - e_{SE}(p, \text{el\_hall}_{max,k}, \text{az\_hall}_{max,k})]^2 + \\ [n_{SE}(\xi_{SE,k}, \alpha_{SE,k}) - n_{SE}(\underline{p}, \text{el\_hall}_{max,k}, \text{az\_hall}_{max,k})]^2 + \\ [v_{SE}(\xi_{SE,k}, \alpha_{SE,k}) - v_{SE}(\underline{p}, \text{el\_hall}_{max,k}, \text{az\_hall}_{max,k})]^2 \end{array} \right\}$$

Written in vector format and simplifying the notation using k to represent ($\text{el\_hall}_{max,k}$, $\text{az\_hall}_{max,k}$) and ($\xi_{SE,k}$, $\alpha_{SE,k}$), the optimum value of $\underline{p}$ is that which minimizes:

$$J(\underline{p}) = \sum_{k=1}^{K} \left[\hat{\underline{S}}_E(k) - \hat{\underline{S}}_E(\underline{p}, k)\right]^T \left[\hat{\underline{S}}_E(k) - \hat{\underline{S}}_E(\underline{p}, k)\right]$$

A tool for finding the minimum is the iterative Newton-Raphson approach. Beginning with the Taylor series truncated after the second term, the array sun vector may be linearized about a preliminary estimate $\underline{p}_i$ of the parameters:

$$\hat{\underline{S}}_E(\underline{p}_i + \Delta\underline{p}, k) \approx \hat{\underline{S}}_E(\underline{p}_i, k) + \left.\frac{\partial \hat{\underline{S}}_E(\underline{p}, k)}{\partial \underline{p}}\right|_{\underline{p}_i} \Delta\underline{p}$$

where $\Delta\underline{p}$ is a change from $\underline{p}_i$ and $$\left.\frac{\partial \hat{\underline{S}}_E(\underline{p}, k)}{\partial \underline{p}}\right|_{\underline{p}_i}$$

is the Jacobian derivative matrix of $\hat{S}_E(p,k)$ with respect to the parameter vector $\underline{p}$ evaluated at $\underline{p}_i$. Substituting the series:

$$J(\Delta\underline{p}) = \sum_{k=1}^{K} \left[\hat{\underline{S}}_E(k) - \hat{\underline{S}}_E(\underline{p}_i, k) - \left.\frac{\partial \hat{\underline{S}}_E(\underline{p}, k)}{\partial \underline{p}}\right|_{\underline{p}_i} \Delta\underline{p}\right]^T \left[\hat{\underline{S}}_E(k) - \right.$$

$$\left. \hat{\underline{S}}_E(\underline{p}_i, k) - \left.\frac{\partial \hat{\underline{S}}_E(\underline{p}, k)}{\partial \underline{p}}\right|_{\underline{p}_i} \Delta\underline{p}\right]$$

the optimum $\Delta\underline{p}$ is found when the derivative of J with respect to $\Delta\underline{p}$ is equal to zero:

$$\frac{\partial J}{\partial \Delta\underline{p}} = -2\sum_{k=1}^{K} \left\{ \left[\hat{\underline{S}}_E(k) - \hat{\underline{S}}_E(\underline{p}_i, k) - \left.\frac{\partial \hat{\underline{S}}_E(\underline{p}, k)}{\partial \underline{p}}\right|_{\underline{p}_i} \Delta\underline{p}\right]^T \left.\frac{\partial \hat{\underline{S}}_E(\underline{p}, k)}{\partial \underline{p}}\right|_{\underline{p}_i} \right\}$$

$$\frac{\partial J}{\partial \Delta\underline{p}} =$$

$$-2\sum_{k=1}^{K} \left\{ \left[\left.\frac{\partial \hat{\underline{S}}_E(\underline{p}, k)}{\partial \underline{p}}\right|_{\underline{p}_i}\right]^T \left[\hat{\underline{S}}_E(k) - \hat{\underline{S}}_E(\underline{p}_i, k) - \left.\frac{\partial \hat{\underline{S}}_E(\underline{p}, k)}{\partial \underline{p}}\right|_{\underline{p}_i} \Delta\underline{p}\right] \right\} =$$

$$\underline{0} \therefore \Delta\underline{p} = \left\{ \sum_{k=1}^{K} \left[\left.\frac{\partial \hat{\underline{S}}_E(\underline{p}, k)}{\partial \underline{p}}\right|_{\underline{p}_i}\right]^T \left[\left.\frac{\partial \hat{\underline{S}}_E(\underline{p}, k)}{\partial \underline{p}}\right|_{\underline{p}_i}\right] \right\}^{-1}$$

$$\sum_{k=1}^{K} \left\{ \left[\left.\frac{\partial \hat{\underline{S}}_E(\underline{p}, k)}{\partial \underline{p}}\right|_{\underline{p}_i}\right]^T [\hat{\underline{S}}_E(k) - \hat{\underline{S}}_E(\underline{p}_i, k)] \right\}$$

and a better estimate of $\underline{p}$ is:

$$\underline{p}_{i+1} = \underline{p}_i + \Delta p$$

The next iteration is begun about $\underline{p}_{i+1}$ and continues while stopping when there is no significant change.

Initial values of $\underline{p}_0$ are necessary to aid convergence of the estimation algorithm. As there is no reason to expect angular offsets, initial values may be set to zero:

$$\Delta\epsilon_A = 0$$

$$\phi_{EP} = 0$$

$$\phi_{NE} = 0$$

As shown in FIG. 2, a physical stop 35 that halts the elevation linear actuator motion may be placed at a point that does not interfere with sun tracking. When the array elevation attempts to pass this point, motion will stop which is detected by sensing an increase in motor current and/or that the Hall shaft positions are no longer changing. Since the position of the stop 35 is known, along with the nominal length of the linear actuator 32 at this point, $A_0$ is set equal to this length and Hall position counter $h_{elevation}$ is set to zero.

Having estimates of all parameters other than the net array angular offset ($\Delta\alpha_A + \alpha_{SP,0}$), the array 16 may be moved to the elevation where the sun is expected. When the sun arrives, as sensed by an increase in array $I_{shortCircuit}$, the position of the $I_{shortCircuit}$ maxima may be determined, the azimuth Hall count $h_{azimuth}$ may be set to zero and $(\Delta\alpha_A+\alpha_{SP,0})$ may be set equal to the ephemeris sun azimuth.

While waiting for the sun to arrive, the elevation and azimuth may be held fixed. They may also be both or singly dithered in a periodic or random pattern to provide active sun seeking activity.

Given these nominal parameter values, Eqs. 1-6 may be used to roughly track the sun as the maximum $I_{shortCircuit}$ quartets are gathered for parameter refinement. Once the parameter values are calculated, they are used for accurate tracking the sun.

Array Isolation

Figure 6:
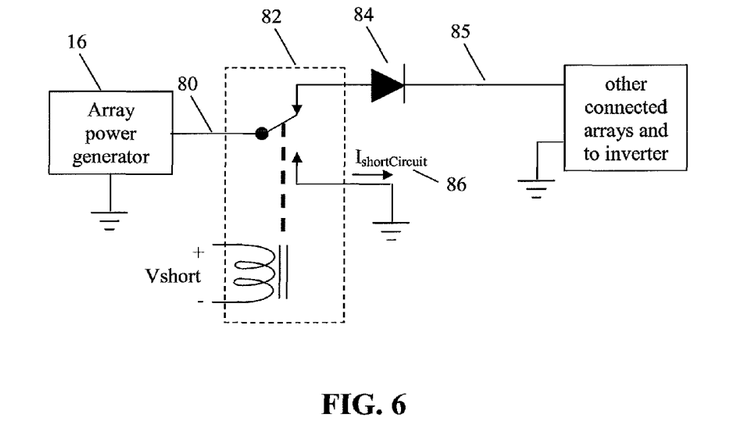
FIG. 6 is a schematic illustration of a relay used to isolate the array.

Regarding isolating array 16 from the inverter and other connected arrays, a single pole double throw relay may be used as illustrated in FIG. 6. The array 16 output line 80 is controlled by relay 82 to pass to the blocking diode 84 and thence 85 to the other connected arrays and inverter, or shorted to array ground. The blocking diode 84 is generally included to protect the other connected arrays from failure of this particular array or when this array output 80 is reduced by clouds. When shorted to array ground by application of $V_{short}$, the array $I_{shortCircuit}$ 86 may be read using various means including the AC715 solid state device by Allegro. As the array $I_{shortCircuit}$ 86 is proportional to the incident solar radiation, it may be measured and used as an indication of array sun pointing.

Figure 7:
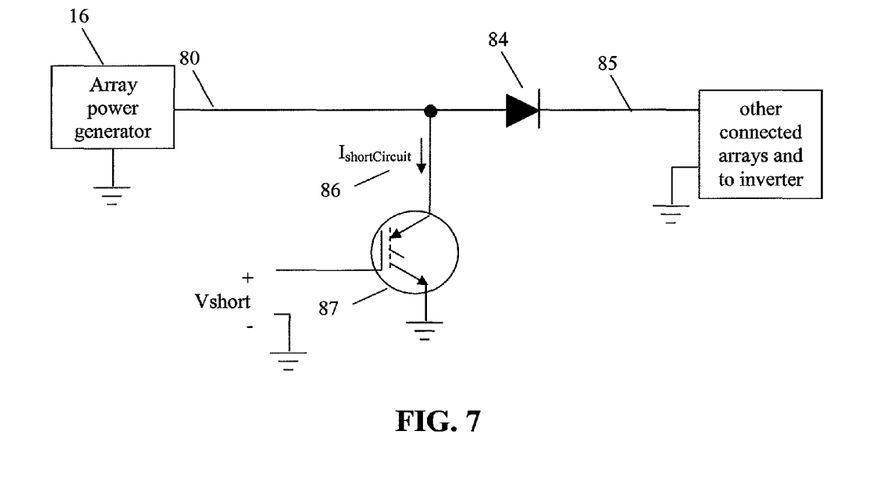
FIG. 7 is a schematic illustration of a solid state means to isolate the array.

A solid state version of this circuit shown in FIG. 7 has the advantage of lower cost, greater long-term reliability, and much faster response. Here the relay may be replaced by an IGBT transistor switch 87. When $V_{short}$ is applied, the transistor turns on and the array is essentially short-circuited and generates $I_{shortCircuit}$ current at minimal voltage. As this reduced output voltage 80 is less than the voltage 85 provided by the other arrays and inverter, blocking diode 84 turns off and disconnects the array from the other arrays and the inverter. The $I_{shortCircuit}$ 86 is proportional to the incident solar radiation and may be measured and used as an indication of array pointing.

Conclusion

Accordingly, the disclosed solar tracking system 10 includes a command calculator 52 configured to generate command signals az_Hall_command, el_Hall_command for controlling the azimuth and elevation motors 22, 28 of a solar power system 12 based upon inputs received from an ephemeris calculator. Therefore, the disclosed solar tracking system 10 may operate without sun sensors or array angle encoders.

Although various aspects of the disclosed solar tracking system have been shown and described, modifications may occur to those skilled in the art upon reading the specification. The present application includes such modifications and is limited only by the scope of the claims.

What is claimed is:

1. A positioning system to cause a solar array to face the sun, the system comprising:
 a mount that defines a first axis and a second axis angularly displaced from the first axis;
 a solar array connected to said mount such that said solar array is rotatable about said first and second axes, the second axis for pivoting the solar array in a vertical direction;
 at least one motor operatively connected through a coupling to the solar array to effect movement of the solar array about the first axis and the second axis, the at least one motor having a measurable rotational shaft position;
 a first sensor to output the at least one motor measured rotational shaft position;
 an ephemeris calculator configured to output an anticipated orientation of the sun relative to a known geographic location of the solar array;
 a command calculator configured to generate at least one motor shaft rotational position command in response to the anticipated sun orientation;
 at least one motor control loop responsive to a difference between the at least one motor shaft rotational position command and the at least one motor measured rotational shaft position, and which outputs at least one a motor drive signal to which the at least one first motor is responsive, such that the difference is made to approach zero;
 an elevation drive assembly driven by the at least one motor, the elevation drive assembly configured to pivot the solar array about the second axis;
 a physical stop positioned on the elevation drive assembly and configured to halt elevation of the solar array about the second axis, whereby a location of the stop on the elevation drive assembly is fed into the command calculator such that a number of Hall counts is initialized to zero by the command calculator at the location of the stop; and
 wherein the solar array is positioned to face the sun as the sun moves with respect to the array geographic location and outputs solar electric energy.

2. The system of claim 1, further including a mathematical model describing the first and second motor shaft positions that cause the array to face the sun for given anticipated sun orientation.

3. The system of claim 2, further comprising coefficients whose values are estimated by curve fitting the model to at least one data set including
 a. sun orientation relative to the known geographic location of the array; and
 b. first and second motor measured rotational shaft positions that cause the array to face the sun.

4. A positioning system to cause a solar array to face the sun, the system comprising:
 a mount that defines a first axis and a second axis angularly displaced from the first axis;
 a solar array connected to said mount such that said solar array is rotatable about said first and second axes;
 a first axis motor operatively connected through a coupling to said solar array to effect movement of said solar array about said first axis, said first motor having a measurable rotational shaft position;
 a first sensor to output the first motor measured rotational shaft position;
 a second motor operatively connected through a coupling to said solar array to rotate said solar array relative to said second axis, said second motor having a measurable rotational shaft position;
 a second sensor to output the second motor measured rotational shaft position;
 an ephemeris calculator configured to output an anticipated orientation of the sun relative to the known geographic location of said solar array;
 a command calculator configured to generate a first motor rotational shaft position command and a second motor rotational shaft position command such that the solar array faces the sun in response to said anticipated sun orientation;
 a first motor control loop responsive to the difference between said first motor rotational shaft position command and said measured first motor rotational shaft position, and which outputs a first motor drive signal to which the first motor is responsive such that the difference is made to approach zero;

a second motor control loop responsive to the difference between said second motor rotational shaft position command and said measured second motor rotational shaft position, and which outputs a second motor drive signal to which the second motor is responsive such that the difference is made to approach zero;

a mathematical model describing the first and second motor shaft positions that cause the array to face the sun for given anticipated sun orientation, and including coefficients whose values are estimated by curve fitting the model to at least one data set including sun orientation relative to the known geographic location of the array; and first and second motor measured rotational shaft positions that cause the array to face the sun; and wherein the solar array is positioned to face the sun as the sun moves with respect to the array geographic location and outputs solar electric energy;

and wherein an electrical energy output of the array is further disabled by an electronic circuit that short circuits the array output.

5. The system of claim 4, further comprising a solid state short circuiting switch and a blocking diode.

6. The system of claim 4, wherein the first and second measured motor rotational shaft positions that cause the array to face the sun are determined by adjusting the first and second motor shaft rotational positions to move the array across the sun until the array produces the maximum array short circuit current.

7. The system of claim 4, wherein the initial orientation of the solar array is established by detecting an increase of the array short circuit current associated with the array facing the sun at known ephemeris orientation relative to the geographic position of the array.

8. The system of claim 7, wherein the array is held fixed awaiting the sun arrival.

9. The system of claim 7, wherein the array is moved in a periodic manner to intersect the sun position.

10. A method for positioning a structure relative to the sun using at least one motor having a rotating shaft with measurable rotational position, the method comprising:
  a) calculating the anticipated orientation of the sun relative to the known geographic location of the structure at a given time;
  b) determining at least one motor shaft position command in response to said anticipated sun orientation;
  c) using at least one sensor to measure the rotational shaft position of said at least one motor;
  d) determining by a command calculator at least one drive signal to move the at least one motor in response to said at least one motor shaft rotational position command and said at least one measured motor shaft rotational position;
  e) turning the at least on motor shaft in response to the at least one motor shaft rotational position command;
  f) coupling said structure orientation to said at least one motor rotational shaft position;
  g) providing an elevation drive assembly driven by the at least one motor, the elevation drive assembly configured to pivot the structure about an axis;
  h) providing a physical stop positioned on the elevation drive assembly and configured to halt elevation of the structure about the axis;
  i) utilizing a location of the stop on the elevation drive assembly in the determining step whereby a number of Hall counts is initialized to zero by the command calculator at the location of the stop; and
  j) repeating steps (j) such that the structure is positioned relative to the sun as the sun moves with respect to the structure geographic location.

11. The method of claim 10, wherein the structure is a solar energy collector.

12. A method for positioning a solar array to face the sun, the method comprising:
  a) constructing a mount to support the solar array;
  b) defining first and second axes describing a first and a second rotation of the array with respect to the mount;
  c) defining a coupling between a first motor and the first axis and between the second motor and the second axis;
  d) measuring a rotational shaft position of the first and second motors;
  e) calculating an anticipated orientation of the sun relative to a known geographic location of said solar array;
  f) calculating by a command calculator a desired first motor rotational shaft position and a desired second motor rotational shaft position such that the array faces the sun at the anticipated sun orientation;
  g) generating a first motor drive signal that causes the difference between the first motor desired rotational shaft position and measured first motor rotational shaft position to approach zero; and
  h) generating a second motor drive signal that causes the difference between the second motor desired rotational shaft position and measured second motor rotational shaft position to approach zero;
  i) providing an elevation drive assembly driven by the second motor, the elevation drive assembly configured to pivot the solar array about the second axis;
  j) providing a physical stop positioned on the elevation drive assembly and configured to halt elevation of the solar array about the second axis, whereby a location of the stop on the elevation drive assembly is fed into the command calculator such that a number of Hall counts is initialized to zero by the command calculator at the location of the stop;
  k) repeating steps (a-h) wherein the solar array is positioned to face the sun as the sun moves with respect to the array geographic location and outputs electrical energy.

13. The method of claim 12, further comprising:
  a) providing a motion limiting physical stop at a known location and
  b) establish the initial orientation of the solar array by detecting at least one said motor ceasing to respond to said associated drive signal in response to having encountered said stop.

14. The method of claim 12, wherein step (f) includes using a mathematical model describing the first and second motor shaft positions that cause the array to face the sun for given anticipated sun orientation.

15. The method of claim 14, wherein step (f) further includes estimating model coefficient values by curve fitting the model to at least one data set including the steps:
  a. determine the sun ephemeris orientation of the sun relative to the known geographic location of the array; and
  b. measure the first and second motor rotational shaft positions that cause the array to face the sun.

16. A method for positioning a solar array to face the sun, the method comprising:
  constructing a mount to support the solar array;
defining first and a second axes describing a first and a second rotation of the array with respect to the mount;

defining a coupling between a first motor and the first axis and between the second motor and the second axis;

measuring the rotational shaft position of the first and second motors;

calculating the anticipated orientation of the sun relative to the known geographic location of said solar array;

calculating a desired first motor rotational shaft position and a desired second motor rotational shaft position such that the array faces the sun at the anticipated sun orientation using a mathematical model describing the first and second motor shaft positions that cause the array to face the sun for given anticipated sun orientation, and estimating model coefficient values by curve fitting the model to at least one data set including determining the sun ephemeris orientation of the sun relative to the known geographic location of the array, and measuring the first and second motor rotational shaft positions that cause the array to face the sun;

generating a first motor drive signal that causes the difference between the first motor desired rotational shaft position and measured first motor rotational shaft position to approach zero; and generating a second motor drive signal that causes the difference between the second motor desired rotational shaft position and measured second motor rotational shaft position to approach zero;

repeating the forgoing steps, wherein the solar array is positioned to face the sun as the sun moves with respect to the array geographic location and outputs electrical energy; and providing an electronic circuit that short circuits an array energy output.

17. The method of claim 16, wherein calculating the anticipated orientation of the sun further includes determining first and second measured motor rotational shaft positions that cause the array to face the sun by adjusting the first and second motor shaft rotational positions to move the array across the sun until the array produces the maximum array short circuit current.

18. The method of claim 16, further including:
detecting an increase of the array short circuit current associated with the array facing the sun, and
initializing the orientation of the solar array at the known sun ephemeris orientation relative to the geographic position of the array.

19. The method of claim 18, further including holding the array is fixed awaiting a sun arrival.

20. The method of claim 18, further including moving the array in a periodic manner to intersect a sun position.

* * * * *